United States Patent [19]

McAdams, Jr. et al.

[11] 4,375,727
[45] Mar. 8, 1983

[54] CANT ANGLE SENSOR ASSEMBLY

[75] Inventors: Hugh P. McAdams, Jr., Port Deposit, Md.; Albert C. Paulovitz, Kennett Square, Pa.

[73] Assignee: Litton Systems, Inc., Drexel Hill, Pa.

[21] Appl. No.: 200,950

[22] Filed: Oct. 27, 1980

Related U.S. Application Data

[63] Continuation of Ser. No. 53,397, Jun. 29, 1979, abandoned.

[51] Int. Cl.³ .......................... G01C 9/06; G01C 9/12
[52] U.S. Cl. ........................................ 33/366; 33/402
[58] Field of Search ........................ 33/344, 366, 402

[56] References Cited

U.S. PATENT DOCUMENTS

| | | | |
|---|---|---|---|
| 2,803,887 | 8/1957 | Fry | 33/366 |
| 3,081,552 | 3/1963 | Reason | 33/366 |
| 4,163,325 | 8/1979 | Hughes | 33/366 |

Primary Examiner—Charles E. Phillips
Attorney, Agent, or Firm—Brian L. Ribando

[57] ABSTRACT

A cant angle sensor comprises a conductive, nonmagnetic pendulum suspended from the shaft of a resolver for limited angular travel in the slot of a C-shaped magnet. When the angle of the sensor changes, the pendulum seeks a new vertical null, and the C-shaped magnet exerts a viscous hystersis damping force causing the pendulum to quickly come to rest without oscillation. The rotor magnet wire of the resolver is connected directly to output terminals to avoid friction due to brush contact on the rotor shaft.

3 Claims, 2 Drawing Figures

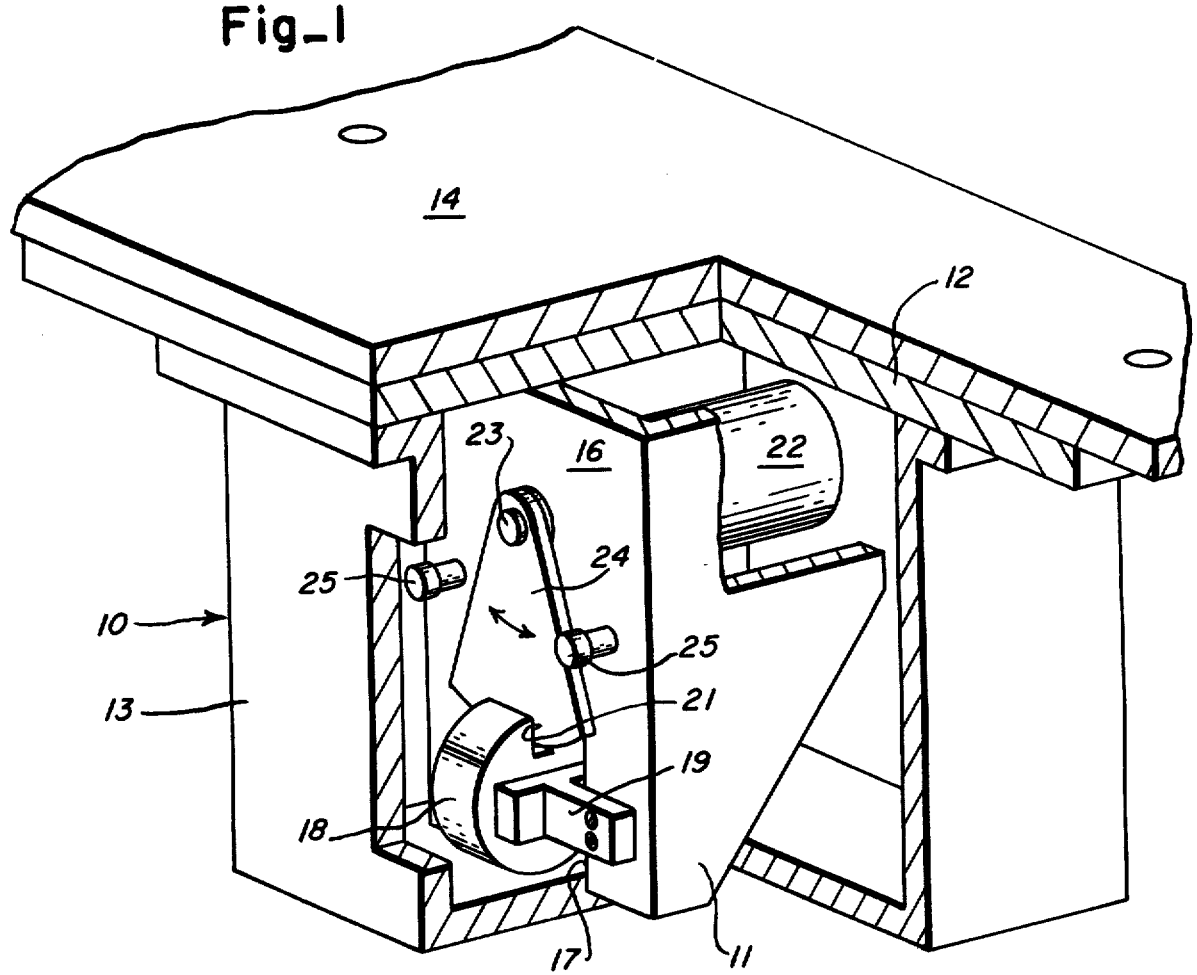
Fig_1
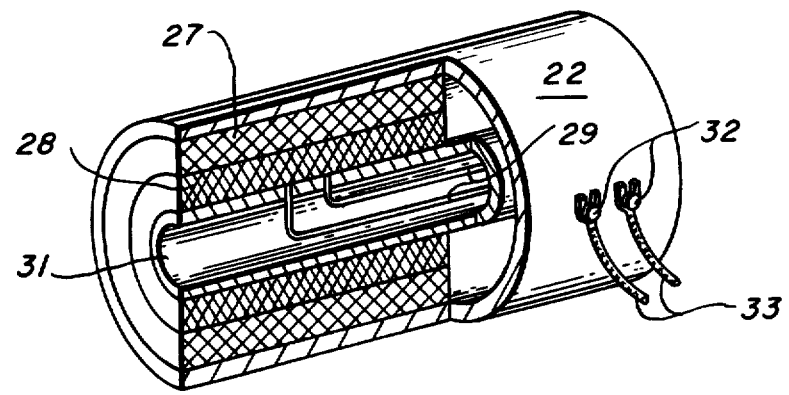
Fig_2

CANT ANGLE SENSOR ASSEMBLY

This is a continuation of copending U.S. application Ser. No. 53,397, filed June 29, 1979, now abandoned.

BACKGROUND OF THE INVENTION

The relation relates to a sensor which gives an indication of a cant angle by means of an output from a resolver.

Cant angle sensors which are used to give an indication of the tilt of a land vehicle are well known in the prior art. A pendulum which is suspended for angular motion seeks a vertical null position as the tilt of the sensor is changed, and the pendulum may be attached to the shaft of a resolver which develops an output signal indicative of this tilt angle. Because the resolver shaft is delicately balanced, the pendulum is prone to oscillations about a vertical null point when a new null is being sought. Various damping means such as magnets in combination with a ferromagnetic pendulum have been used to limit these oscillations. The force exerted by the magnets on the pendulum requires the pendulum to be heavy so that the damping force of the magnets is not so great that the pendulum will not seek a true vertical null. Brush contacts rubs on the resolver shaft to couple signals developed in the resolver to output terminals. These brush contacts inherently exert a frictional force on the resolver shaft. A very light brush force often results in noise and erroneous signals being generated, while a heavier force increases the turning resistance of the shaft requiring the pendulum to be even larger. In an attempt to avoid the use of brush contacts, hairsprings have been provided to conduct output signals from the rotor coils to output terminals. These hairsprings are never without an elastic memory however, and this memory exerts a restoring force on the rotor shaft to give a null signal which is not true. A torqueless or brushless resolver can be built utilizing pure electromagnetic coupling between the rotor shaft and the resolver output leads, but the cost of such a device is too high to be a commercially satisfactory alternative.

SUMMARY AND OBJECTS OF THE INVENTION

The present invention comprises a cant angle sensor which uses a small, lightweight, conductive, and nonmagnetic pendulum suspended from the shaft of a resolver. Stops are provided to limit the arc through which the pendulum may swing, and the pendulum itself is suspended so as to be partially contained within the slot of a C-shaped magnet. As the cant or tilt of the sensor changes, the pendulum seeks a new null position which represents a true vertical, and motion of the pendulum within the slot of the C-shaped magnet causes the magnet to exert a viscous hystersis damping force causing the pendulum to come quickly to rest without oscillations about the new null. The hystersis damping force is proportional to the velocity of the pendulum through the slot, resulting in a high force being exerted when the pendulum is first seeking a new null, with the force lessening as the null is approached. The signals which are developed by the rotor of the resolver are coupled directly to the resolver output terminals by the rotor magnet wire. This arrangement obviates the need for friction causing brushes on the rotor shaft or expensive magnetic coupling arrangements.

It is therefore an object of the invention to provide a cant angle sensor comprising a conductive nonmagnetic pendulum suspended from the shaft of a resolver in the slot of a C-shaped magnet.

It is another object of the invention to provide a cant angle sensor wherein a viscous hystersis damping force is exerted on a conductive nonmagnetic pendulum by the slot of a C-shaped magnet in which the pendulum is suspended, wherein the pendulum is coupled to the shaft of a resolver which output is connected directly to input terminals without the use of friction producing brushes.

These and other objects of the invention will become apparent from the following specification taken in conjunction with the accompanying drawing figures.

BRIEF DESCRIPTION OF THE DRAWINGS

FIG. 1 is a perspective view of a cant angle sensor according to the invention.

FIG. 2 is a partial sectional view of the resolver in the cant angle sensor of FIG. 1

DESCRIPTION OF THE PREFERRED EMBODIMENT

Turning now to the drawings, there is shown in FIG. 1 a cant angle sensor generally designated by the reference numeral 10. The sensor comprises a frame 11, a top portion 12, and a housing 13. The top portion 12 may be used in attaching the sensor to a horizontal support surface 14.

The frame 11 includes a front mounting plate 16 having a lower rectangular aperture 17 formed in the bottom portion thereof. A magnet 18 may be positioned in the aperture 17 and the magnet is mounted to the mounting plate 16 by a magnet mount 19. The magnet 18 may be of the Alnico type, is generally C-shaped, and includes a slot 21 which comprises a flux path.

A resolver 22 is located within the frame 11 and may be mounted to the back of the mounting plate 16 in a known way. A resolver shaft 23 may extend through the mounting plate 16 and a pendulum 24 is nonrotatably attached to the resolver shaft 23 with the lower portion of the pendulum 24 disposed within the slot 21. Two stops 25 are positioned on either side of the pendulum 24 and act to limit the arc through which the pendulum may swing. Copper may be preferably employed for the material of the pendulum, but other dense, nonmagnetic and conductive materials such as aluminum, silver, or gold may also be used.

Turning now to FIG. 2, it will be seen that within the resolver 22 an array of field coils 27 closely surround an array of rotor coils 28. The rotor coils 28 comprise a high number of turns of magnet wire which is disposed on the rotor form according to known techniques, and the ends 29 of the magnet wire from the rotor coils 28 are led through the rotor shaft 31 to output terminals 32. Lead wires 33 may be connected to the output terminals 32 so that signals developed by the rotor of the resolver may be coupled to a remote indicator (not shown). It will be appreciated that because the stops 25 limit the swing of the pendulum 24 of an arc of 90° or less, the magnet wires 29, although they are attached directly to terminals 32, will not be twisted to the point of fracture by the rotation of the resolver shaft 31.

The operation of the device will be obvious to those skilled in the art. When the support surface 14 to which the sensor 10 is attached is horizontal, gravity will cause the pendulum 24 to be suspended in a vertical null position centered on the mounting plate 16. As the support surface 14 is tipped to the left or right as viewed in FIG. 1, the pendulum 24 will rotate relative to the mounting plate 16 to maintain a vertical null position. This will cause the rotor coils 28 of the resolver to rotate relative to the field coils 27 and to develop an electrical signal indicative of the new relative positions of the coils. This signal is coupled to the output terminals of the resolver by the magnet wires 29. As the pendulum which is conducting and nonmagnetic moves across the magnetic flux within the slot 21 of the magnet 18, a viscous hystersis damping force is developed which is proportional to the speed of motion of the pendulum through the slot. When the velocity of the motion is great, the damping force is high, but as the pendulum approaches a new vertical null position, the decrease in the velocity of motion of the pendulum through the slot 21 causes a decrease in the damping force which is applied to the pendulum. In a steady state condition where the pendulum 24 is at a vertical null position, no force is exerted by the magnet 18. It will be appreciated that the direct connnection of the magnet wire 29 to the output terminals 32 avoids the use of brushes which otherwise bear on the rotor shaft 31 and inherently restrict the freedom of motion of the pendulum 24.

A cant angle sensor constructed in accordance with the present invention is able to be much smaller and lighter than heretofore possible because of the combination of the nonmagnetic material of the pendulum which is able to be viscously damped by a small magnet and the frictionless brushless connection between the rotor shaft and the resolver output terminals.

Having thus described the invention, various modifications and alterations will occur to those skilled in the art, which modifications and alterations are intended to be within the scope of the present invention as defined in the appended claims.

We claim:

1. A cant angle sensor adapted to be attached to a supporting surface for developing a signal for representing a limited degree of tilt of the surface, the sensor comprising:
   a resolver including a stator and a rotor having an axial shaft,
   means for coupling a signal generated by said rotor to stationary resolver output terminals so that minimal drag is exerted on said rotor comprising resolver magnet wire directly connected from said rotor to said output terminals,
   a conductive, nonmagnetic pendulum nonrotatably attached to said rotor shaft and effective to cause relative motion between said rotor and said stator,
   magnet means for exerting a magnetic field across a flux path, a portion of said pendulum beng suspended for motion in the flux path, said magnet means exerting a viscous hysteresis damping force directly on said pendulum as said pendulum moves in the flux path thereby directly damping motion, and
   stop means arranged in the path of said pendulum for limiting the motion of said rotor to less than 90° thereby preventing damage to said coupling means, and for maintaining a portion of said pendulum always within the flux path.

2. The cant angle sensor of claim 1 further comprising:
   a C-shaped magnet comprising the magnet means, wherein a portion of the pendulum is suspended for motion within the gap of the C.

3. A cant angle sensor adapted to be attached to a supporting surface for developing a signal for representing a limited degree of tilt of the surface, the sensor comprising:
   a resolver including a stator and a rotor having an axial shaft,
   means for coupling a signal generated by said rotor to stationary resolver output terminals so that minimal drag is exerted on said rotor comprising resolver magnet wire directly connected from said rotor to said output terminals,
   stop means for limiting the rotation of said rotor to less than 90° thereby preventing damage to said coupling means,
   viscous hysteresis dampening means for dampening rotational movement of said rotor including
      a conductive non-magnetic damper paddle affixed to and suspended from one end of said rotor shaft, and
      a C-shaped permanent magnet positioned beneath said paddle such that an edge portion of said paddle is located between the poles of said magnet regardless of the orientation of said rotor within its limited rotational range, and
   said rotor having a moment arm consisiting of only said damper paddle for effecting rotational movement of said motor relative to said stator responsive to gravitational forces exerted on said paddle.

* * * * *